United States Patent [19]

Skavnak

[11] 3,850,523

[45] Nov. 26, 1974

[54] PHOTOCOPIER LIGHT BOX

[75] Inventor: James Edward Skavnak, Minneapolis, Minn.

[73] Assignee: Minnesota Mining and Manufacturing Company, St. Paul, Minn.

[22] Filed: July 13, 1973

[21] Appl. No.: 379,167

[52] U.S. Cl.............. 355/70, 240/41.1, 240/41.37, 355/119
[51] Int. Cl. .......................................... G03b 27/54
[58] Field of Search ... 355/67, 68, 69, 70, 113–120; 240/41.1, 41.35, 41.37

[56] References Cited
UNITED STATES PATENTS

| | | | |
|---|---|---|---|
| 1,306,511 | 6/1919 | Ames, Jr. | 240/41.35 R |
| 3,428,397 | 2/1969 | Elmer | 355/70 X |
| 3,498,714 | 3/1970 | Elmer | 355/70 |
| 3,586,849 | 6/1971 | Starkweather | 355/70 X |
| 3,669,538 | 6/1972 | Fowler | 355/70 |
| 3,777,135 | 12/1973 | Rees | 355/70 X |

Primary Examiner—Samuel S. Matthews
Assistant Examiner—E. M. O'Connor
Attorney, Agent, or Firm—Alexander, Sell, Steldt & DeLaHunt

[57] ABSTRACT

A photocopier light box having a very small depth to width ratio provides a predetermined illumination pattern at an original document support platen by utilizing tubular xenon flash lamps in conjunction with cylindrical specular reflectors, the reflectors having generally hyperbolic cross sections above the lamps and generally elliptical cross sections below the lamps, the angle between the respective sections being selected to obtain the required light distribution.

2 Claims, 3 Drawing Figures

PHOTOCOPIER LIGHT BOX

FIELD OF THE INVENTION

The present invention relates to a photocopier light box providing illumination of an original document for copying.

BACKGROUND OF THE INVENTION

Photocopiers in which the image of an original is formed on an intermediate sheet, belt or drum utilize a light box constructed to illuminate the original document from below and around the edges thereof. An imaging lens is located below the original document to collect light diffusely reflected from the document and to image it onto an intermediate sheet, belt or drum. Prior art light boxes have generally utilized a large, deep, light diffusing area so that light from the lamp or lamps uniformly illuminate the original document. When a large area is required to be copied and semi-field angle of the imaging lens is large. The lens itself contributes to a fall off in illumination across the image, which, for a perfect lens, is proportional to the fourth power of the cosine of the semi-field angle. This requirement demands the design of an illumination system whose intensity distribution when combined with that from the lens gives a uniform intensity distribution across the image plane.

Light boxes designed to compensate for the illumination pattern of the imaging lens are disclosed in U.S. Pat. Nos. 3,586,849 and 3,669,538. However as with other prior art light boxes, those constructed according to these patents are deep, that is the vertical distance from the lamps and reflectors to the platen is relatively large. While this reduces the angle of incidence of the light at the platen, thereby simplifying the problem of producing the desired illumination pattern it reduces the overall intensity due to the larger distance of the source from the platen. In addition there is an undesirable increase in the height of already large photocopiers.

SUMMARY OF THE INVENTION

The present invention provides a photocopier light box characterized by a small depth to width ratio and comprising a support frame including a flat, transparent, rectangular platen for supporting an original document, a pair of tubular Xenon flash lamps mounted in the support frame below the platen, one lamp extending parallel to, spaced from and along the length of each of the longitudinal edges of the platen, and a pair of cylindrically shaped specular reflectors, one parallel to each of the lamps along the length of the platen, each reflector having a generally hyperbolic cross section above its associated lamp and adjacent the platen and a generally elliptical cross section below the lamp. The lamps and reflectors combine to give the desired ilumination distribution at the platen. The required illumination pattern is obtained by the selection and placement of the reflectors. In general the illumination toward the center is controlled by the elliptical portions of the reflectors and that at the edge by the hyperbolic portions of the reflectors.

DESCRIPTION OF PREFERRED EMBODIMENT

Figures 1, 3:
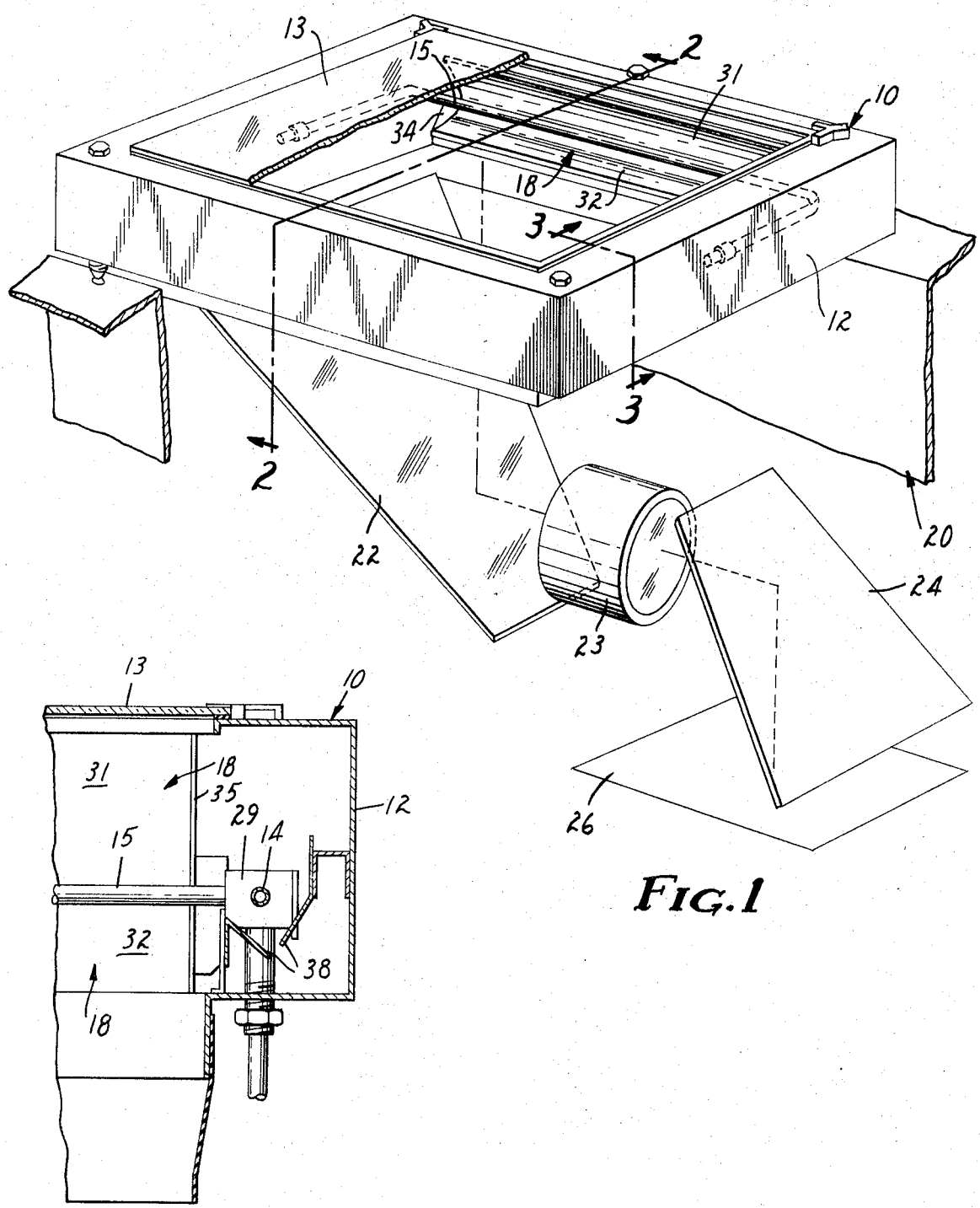
FIG. 1 is a partially sectioned perspective view illustrating a photocopier utilizing a light box constructed in accordance with the present invention.
FIG. 3 is a cross-sectional view taken along line 3—3 of FIG. 1.
Figure 2:
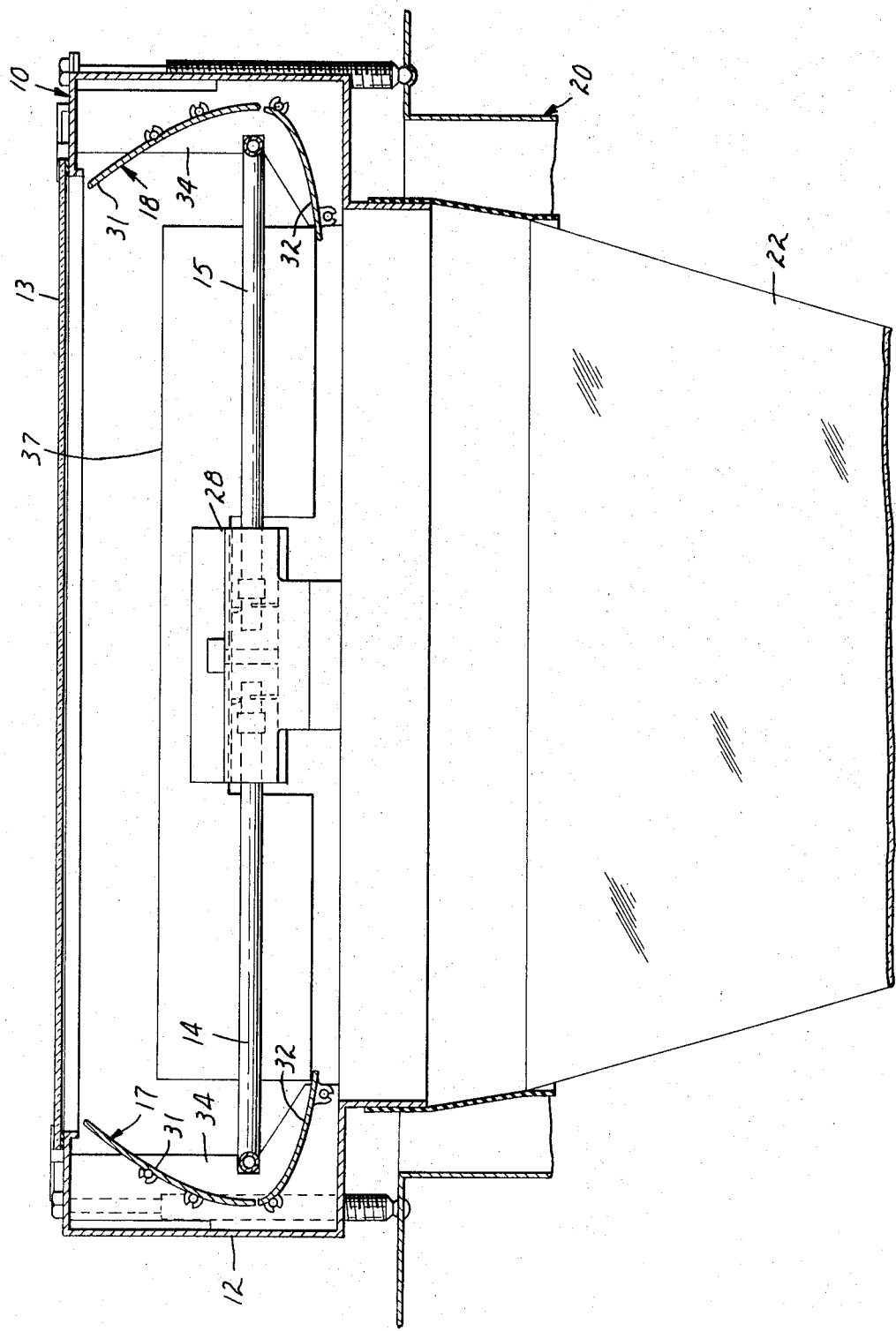
FIG. 2 is a cross-sectional view taken along line 2—2 of FIG. 1.

The light box of the present invention, generally designated 10, comprises a support frame 12 including a glass platen 13, a pair of tubular Xenon flash lamps 14 and 15 and a pair of cylindrically shaped specular reflectors 17 and 18. The light box 10 is illustrated in FIG. 1 in use on a photocopier 20 including a front surface mirror 22 mounted at a 45 degree angle to the light box to transmit light therefrom through an imaging lens 23 and therefrom via a second front surface mirror 24 onto the imaging plane defined by an intermediate sheet 26.

The lamps 14 and 15 are mounted in the support frame 12 below the platen 13, one lamp extending parallel to, spaced from and along the length of each of the longitudinal edges of the platen 13. The illustrated lamps are frosted tubular Xenon flash lamps which are U-shaped and which have their ends mounted in plastic insulator blocks 28 and 29 at the ends of the platen. The lamps 14 and 15 are connected to a power supply through the insulator block 29 to provide flash exposure by exciting the lamps with a high voltage of short duration.

The cylindrically shaped specular reflectors 17 and 18 extend one parallel to each of the lamps 14 and 15, respectively, along the length of the platen 13. Each reflector 17 and 18 has a generally hyperbolic cross-section 31 above its associated lamp and adjacent the platen 11 and a generally elliptical cross-section 32 below the lamp. The centerline of each lamp 14 and 15 is positioned at one of the line foci of the elliptical portion 32 of the associated reflector. The reflectors 17 and 18 are, for example, extruded and polished aluminum with the hyperbolic and elliptical portions 31 and 32 extruded in separate segments and held in their relative positions in the support frame 12 by end caps 34 and 35 which also support the lamps 14 and 15.

The illumination pattern can be controlled by carefully arranging the lamps 14 and 15 in relation to the predetermined reflectors 31 and 32 and by adjusting the angle between the respective segments of the reflectors. In this way overlapping patterns can be obtained which can be used to obtain the desired distribution across the platen which, when modified by the lens characteristics, will give a uniform intensity distribution at the intermediate 26.

The cylindrically shaped specular reflectors 17 and 18 and the lamps 14 and 15 do not, however, provide the entire illumination pattern at the platen 13. For the purpose of fine tuning the illumination pattern, known in the art as trimming, specular end reflectors 37 and 38 are mounted in the support frame 12, one at each end of the light box along the transverse edges of the platen. These end reflectors 37 and 38 serve to increase the illumination level at the ends of the platen 13 to close the loop around the platen at the ends of the reflectors 17 and 18. This is necessary to compensate for the lens characteristics and because the side lamps and reflectors are not infinitely long.

In one specific example of the present invention a light box 10 was constructed as illustrated in the drawings for use in a variable magnification photocopier. The light box was 24 inches long, 18 inches wide and 4½ inches deep. The platen 13 was 15 inches by 19 inches to accomodate original documents up to 14 inches by 18 inches. To maintain a fixed reference edge when the magnification is varied the imaging lens 23 was moved vertically and horizontally thereby moving its axis as reflected by the first mirror 22 longitudinally of the light box 10, in each position requiring a different center of the illumination pattern at the platen as an optimum illumination pattern for photocopying. To accomodate all of the positions of the imaging lens 23 it was determined that an illumination pattern at the platen 13 of concentric ellipses increasing in intensity from the center outward would provide the best possible compromise.

The cylindrical specular reflectors 17 and 18 were 19 inches long and were centered on the longitudinal edges of the platen, the hyperbolic and elliptical portions 31 and 32 thereof being separately formed of polished aluminum. The curve for the elliptical portion was defined by the equation $(X/11.4)^2 + (Y/3.5)^2 = 1$ and the curve for the hyperbolic section was defined approximately by the expression $(X/3)^2 - (Y/1.9)^2 = 1$. Portions of the ellipse and the hyperbola defined by the above expressions were chosen to match the curves at their juncture, the foci of the ellipse being located at an angle of 16° to the horizontal, the lamp being positioned a distance of 0.551 inches from the juncture of the reflector portions 31 and 32. The hyperbolic portions 31 extended vertically a distance of 2.375 inches above the foci of the elliptical portion 32 which extended a horizontal distance of approximately 1.9 inches.

The tubular lamps 14 and 15 were Xenon flash lamps having an external diameter of 0.39 inch, major length of 21.28 inches and a length in the end legs of 7.5 inches. The specular end reflectors 37 and 38 were 14.5 inches long and were positioned symmetrically along the transverse edges of the platen.

The light box constructed in accordance with the above specifications provided the desired illumination pattern at the platen 13 inversely compensating for the light transmission pattern of the imaging lens 23 to produce an image at the intermediate 26 which was uniform within allowable tolerances in all positions of the imaging lens 23. This was evidenced by production of uniformly exposed copies at each of the magnification settings of the photocopier.

I claim:

1. A photocopier light box with a small depth to width ratio, comprising:

a support frame including a flat, transparent, rectangular platen for supporting an original document, a pair of tubular Xenon flash lamps mounted in said support frame below said platen, one said lamp extending parallel to, spaced from, and along the length of each of the longitudinal edges of said platen, and a pair of cylindrically shaped specular reflectors, one parallel to each of said lamps along the length of said platen, each said reflector having a generally hyperbolic cross section above its associated lamp and immediately adjacent said platen and a generally elliptical cross section below the lamp, said lamps and reflectors combining to produce a predetermined illumination pattern at said platen.

2. The photocopier of claim 1 wherein said flash lamps are frosted.

* * * * *